Nov. 8, 1960     H. F. KAMMERER     2,959,269
SHEET HANDLING SYSTEMS

Filed Jan. 27, 1958     2 Sheets-Sheet 1

INVENTOR.
Howard F. Kammerer
BY
Nobbe & Swope
ATTORNEYS

Nov. 8, 1960

H. F. KAMMERER 2,959,269

SHEET HANDLING SYSTEMS

Filed Jan. 27, 1958

INVENTOR.
Howard F. Kammerer
BY
Nobbe & Swope
ATTORNEYS

United States Patent Office 2,959,269
Patented Nov. 8, 1960

2,959,269

SHEET HANDLING SYSTEMS

Howard F. Kammerer, Ottawa, Ill., assignor to Libbey-Owens-Ford Glass Company, Toledo, Ohio, a corporation of Ohio Filed Jan. 27, 1958, Ser. No. 711,391

2 Claims. (Cl. 198—31)

This invention relates broadly to the handling of sheet materials and more particularly, to an improved control system for automatically transferring a series of moving articles of this type from one predetermined path to a second path of movement.

Generally stated, this invention has been employed to advantage in conveyor line systems wherein it is desirable from the standpoint of economy and efficiency to alternatively remove conveyed articles from one conveyor to another and to, then if desired, sequentially return them from the second conveyor to a further conveyor generally aligned with the first. For example, the invention has found practical use in the movement of pre-assembled articles, such as of glass sheets and plastic interlayer sheets in the manufacture of laminated or so-called "safety glass."

According to one well-known procedure safety glass is produced by placing glass sheets, either flat or curved, on a conveyor line and, while they are travelling there-along, combining them with a interlayer of non-brittle thermoplastic material to form the familiar glass-plastic "sandwich." These sandwiches then have to be pressed, to expel entrained air and vapors therefrom; heated; and then again pressed to more adhesively bond the softened plastic to the glass surfaces. Now, in the manufacture of relatively large sheets of laminated glass and especially those of the curved character required for automobile windshields, it will be apparent that the initial "lay-up" or assembly of the glass and plastic sheets and their ultimate removal from the assembly conveyor line requires considerably less time than is required to process the sandwiches through the necessary preliminary pressing operations.

It is an aim of this invention to maintain the assembly line conveyor at a rate of continuous productivity by alternately and automatically connecting the same first to one and then to another of following conveyor lines in which the customary processing or prepressing equipment is situated. Upon completion of the prepressing steps, the pressed sandwiches are returned in an automatic manner first from one prepressing line and then from the other to a final or discharge conveyor which may, or may not, be aligned with the first conveyor line. The prepressed sandwiches are then carried on this conveyor, at a substantially rapid rate of movement, to an area in which they can be removed preparatory to the final pressing operation in an autoclave.

Another important object of the invention, therefore, is the provision of an improved control system which automatically and alternately causes the transfer of a series of moving articles from one conveyor system to a second conveyor system.

Another object is to provide an improved control system which is adapted to be actuated by one moving article to divert a subsequent moving article from one path to another.

Another object of the invention is the provision, in a control system of the character above described, of means for progressively shifting a moving article from one position to a second position while the article is being diverted from one path of movement to a second path.

A further object is to provide in a control system of the character above described a conevyor line for moving an article along a predetermined path of movement substantially transversely disposed relative to the longest axis of the article, a second conveyor line for moving an article along a predetermined path of movement substantially parallel to the longest axis of the article with interposed means adapted to directively carry the article from the first predetermined path to the second predetermined path while automatically shifting the said article until the longest axis thereof is substantially parallel to the path of its movement.

Other objects and advantages of the invention will become more apparent during the course of the following description when read in connection with the accompanying drawings.

In the drawings forming a part of this application and wherein like numerals are employed to designate like parts throughout the same:

Figure 1:
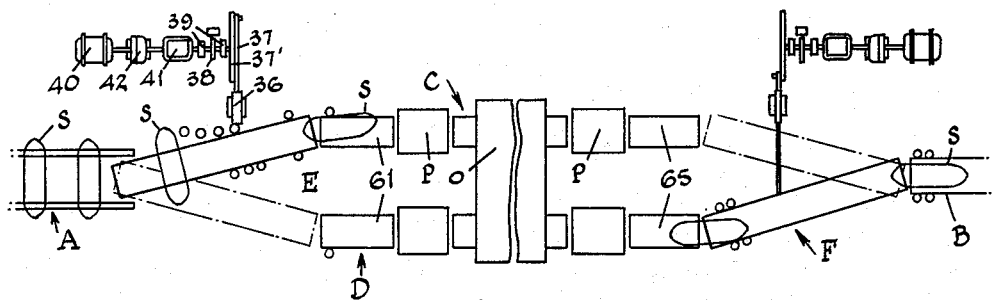
Fig. 1 is a diagrammatic plan view of a conveyor system in which this invention is employed.

Referring now more particularly to Fig. 1 of the drawings, there is shown a system of conveyors operatively interconnected by suitable controls in accordance with the invention. As herein shown, a supply or assembly conveyor generally designated by the letter A is disposed in substantially axial aligned relation with a spaced end or discharge conveyor B. Between the opposed ends of conveyors A and B, intermediate processing conveyor lines C and D are arranged; the longitudinal axes of these conveyor lines being substantially parallel to each other, to the axial line of conveyors A and B and substantially equally spaced outwardly therefrom. Access from the supply conveyor A to either conveyor line C or D is alternatively attained by means of a pivotally swingable transfer conveyor E while between the conveyor lines C or D, at their opposite ends, and the discharge conveyor B a substantially similar transfer conveyor F is located.

The purpose of employing the transfer conveyors E and F is to enable a more or less rapid assembly, in the present instance, of glass sheets and an interposed plastic layer which is then commonly known as a sandwich as indicated at S. When the sandwiches reach the end of the conveyor A, it is preferable that they be passed through apparatus P equipped with suitable pressing rolls and are then carried through a heating oven O. Upon emerging from the oven, the sandwiches are again subjected to pressure in a second pressing apparatus and from this operation they are conveyed to an area adjoining the autoclaves. It will be appreciated that the assembly of the sandwiches on conveyor A and their eventual removal from the conveyor B can be handled much more expeditiously than the pressing and heating operations. Consequently, it is now proposed to maintain an adequate "flow" of assembled sandwiches by alternately supplying the sandwiches to either one of two pressing lines and to provide automatic means whereby an advancing sandwich upon being transferred to one pressing line will cause the transfer of a subsequent sandwich to a second pressing line. Also, upon being pressed on either of two pressing lines, the sandwiches moving therefrom will cause, in an automatic manner, the sequential transfer from one pressing line and then from the other to the discharge conveyor.

Figure 2:
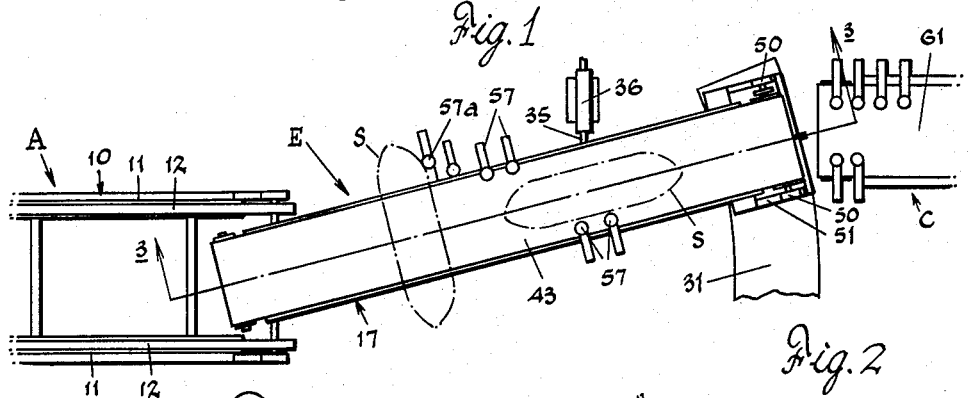
Fig. 2 is an enlarged plan view of one end of the conveyor system of Fig. 1.
Figure 3:
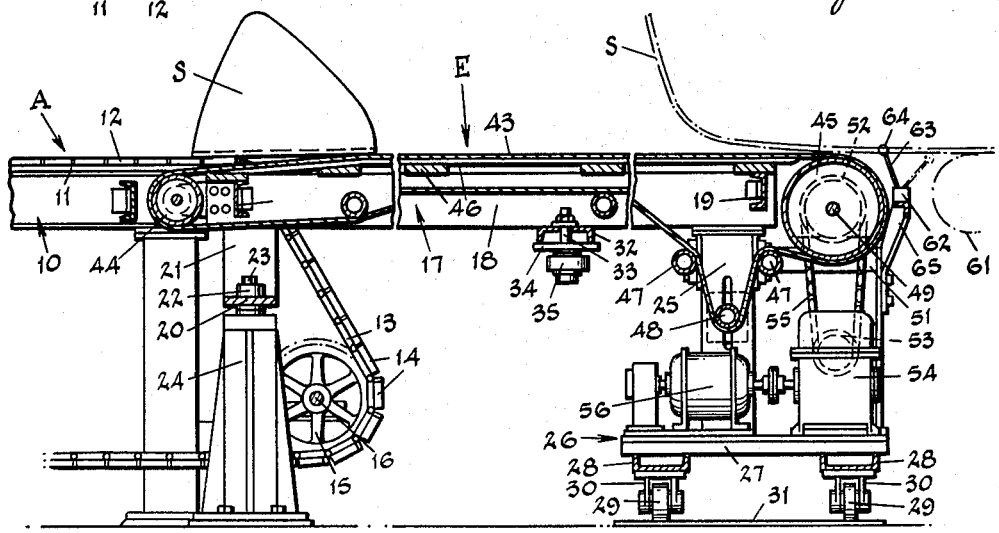
Fig. 3 is a vertical longitudinal sectional view substantially as taken on line 3—3 of Fig. 2.
Figure 5:
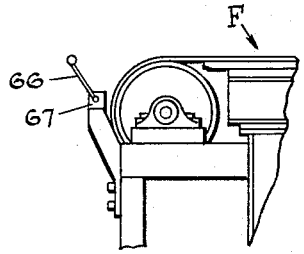
Fig. 5 is a fragmentary elevational view of the operating source for the conveyor system.
Figure 4:
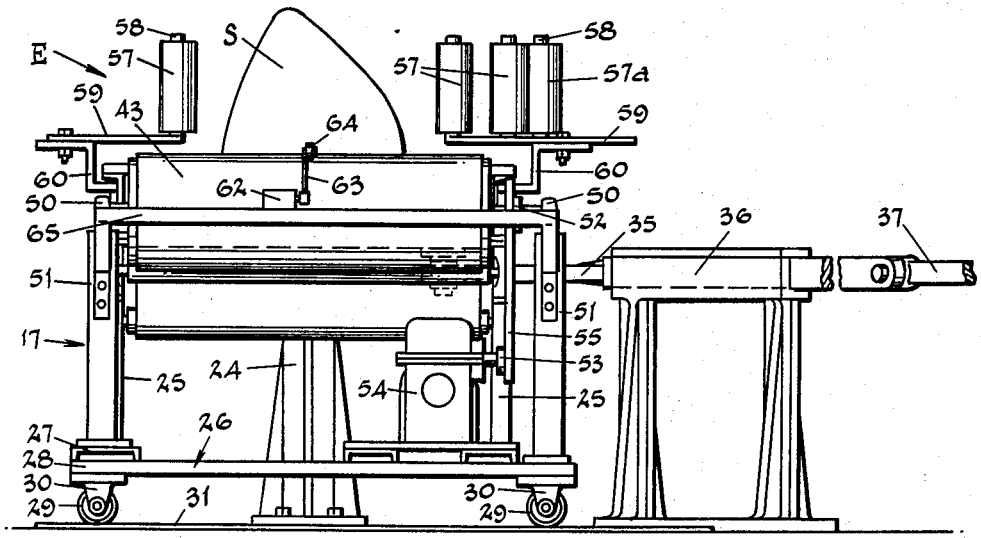
Fig. 4 is an elevational view of one end of the transfer conveyor.

More particularly, and as shown in Figs. 2 and 3, the conveyor A has a structural frame 10 along the spaced upper edges of which tracks 11 are mounted for guiding substantially endless conveyor belts 12. These preferably comprise pivotally connected links 13 having blocks 14 of rubber, or like resilient materials, secured thereto. The belt links, as shown in Fig. 3, are entrained about operatively driven sprockets 15. These are keyed on a shaft 16 journaled at its ends in suitable bearings carried by the frame 10. The belts 12 are spaced apart sufficiently to carry the individual sheets of a matched pair, until they have been assembled with a plastic interlayer, along a path substantially transverse to their longer axis. The sandwiches S in reaching the end of conveyor A and the entry end of transfer conveyor E are transversely disposed to the conveyors' direction of movement.

The transfer conveyor E has a framework 17 which may be comprised of longitudinally and horizontally disposed side channels 18 and transversely disposed bracing channels 19. At its end adjoining the conveyor A, the framework is mounted for pivotal movement by means of a beam 20 supported by side channels 18 by struts 21. Medially between the struts, beam 20 is provided with a bracket 22 in which a vertically disposed king-pin 23 is secured. The pin is rotatably received in a suitable thrust bearing that is contained in or mounted on a floor supported column 24.

At its opposite end, the frame 17 is equipped with vertically disposed pedestals 25 that are secured at their lower ends to a base 26 formed by longitudinally and transversely disposed channels 27 and 28. Each end of the channels 28 is provided with casters 29 rotatably mounted in brackets 30. To provide a relatively smooth surface for traversal of the casters, a track or floor plate 31 of metal is employed. The framework 17 of transfer conveyor E may thus be easily swung between the positions indicated in Fig. 1 of the drawings and accordingly be located to interconnect the conveyor E with the entry end of the pressing lines C or D.

For this purpose, the side channels 18 carry a channel 32 to which is secured a vertically disposed pin 33 that may be secured between the web of said channel and a plate 34 secured to the flanges thereof. The pin 33 rotatably carries the end of a link 35 that is slidably carried in a bracket 36. At its opposite end, the link 35 is connected to a suitably driven crank arm 37 by drive plate 37'. The arm is keyed on a shaft 38 journaled in bearings 39 and driven by a motor 40 through a transmission or speed reducer unit 41. The operative connection between the motor and the reducer unit is conventionally completed by means of an electromagnetic clutch 42. As will hereinafter be more fully described, the clutch is actuated by means of a switch mechanism controlled by rotation of the shaft 38.

In either of the positions to which the transfer conveyor E is swung, it is adapted to carry an assembled sandwich S from the conveyor A and, while so moving the same, cause it to be swung substantially ninety degrees so that the sandwich will be received at the entry end of a pressing conveyor line while moving with its longest axis substantially parallel to the path of its movement. For this purpose, the conveyor is equipped with an endless belt 43, which is entrained by suitably mounted belt rollers 44 and 45 and so that the upper flight of the belt will traverse a support floor 46 mounted on the framework channels 18. The looped portion of this belt passing about the roller 45 is carried over support rolls 47 between which a tensioning roll 48 is disposed. The roll 48 is adapted to be moved upwardly or downwardly to adjust the belt by means of suitable adjustment members slidably mounted on the pedestals 25. The shaft 49 for belt roll 45 is journaled in bearings 50 mounted on brackets 51 of the framework 10 and mounts a sprocket 52 coupled to a drive sprocket 53 of a reduction unit 54 by roller chain 55. The unit 54 is operated by a motor 56 with which it is mounted on a base plate carried by the base 26.

In order to shift an assembled sandwich while it is carried forwardly on the conveyor belt 43, a plurality of vertically disposed rolls 57 are arranged along the sides of the framework 17. These rolls can be provided with relatively soft peripheral surfaces as would be afforded by a sleeve of felt material carried by a mandrel rotatably supported on a shaft 58 mounted on a bracket 59. Each of the brackets 59 are fixedly secured to the side channels 18 of the conveyor framework and provided with slots 60 in which the related shafts 58 can be moved to various positions of adjustment. Accordingly the first roll 57 on one side of the conveyor may be positioned to engage an end of the leading edge of a sandwich and since said sandwich is being moved forwardly, this interference at one end will cause the opposite end to be swung inwardly. In this instance of curved glass sheets to eventually become automobile windshields, and as herein shown, this shifting of the sandwich locates the same for proper approach to the pressing apparatus. Also, as shown, the remaining rolls 57 can be arranged to create a "channel" and thus guide the sandwich as it is swinging so that the axis of the curvature thereof will be substantially transverse to the path of its movement.

Now, as the sandwich S reaches the end of the transfer conveyor E and is delivered to the entry conveyor 61 of the immediate prepressing line, it operates a switch 62 mounted on the framework 17. More particularly, the switch is of the so-called "whisker" variety and has a relatively long actuator lever 63 equipped with a contact roll 64. The case of the switch is fixedly carried on a structural bridge 65 secured to the brackets 51 of the framework. Preferably the roll 64 is disposed above the plane of the belt 43 and consequently when a sandwich passes thereover, the lever 63 will be swung radially downward and held until released as when the roll 64 thereon is disengaged from the sandwich. Return motion of the lever 63, in the switch herein employed, actuates the same and produces energization of the clutch 42 whereupon the shaft 38 will be driven by the reduction unit 41 to operate the crank arm or plate 37. Now, with the several associated parts positioned as shown in Figs. 1 and 2, the link 35 will push the transfer conveyor E thereby causing it to pivot on the king-pin 23, while the casters 29 are traversing the floor plate 31, from the full line position to one indicated in broken line.

In the normal movement of a succession of assembled sandwiches, there will usually be two thereof on the transfer conveyor E. As herein provided, the switch lever 63 is not released until the first sandwich has been entirely discharged onto the entry conveyor 61; then as the lever 63 is released, the transfer conveyor is rather rapidly swung as from the pressing line C to the line D. However, during the course of these events, the second sandwich has been advanced into the vicinity of the leading roll 57 and is caused to swing on the belt 43 until the longest axis thereof is substantially parallel to its predetermined path of movement and as it is directed to the entry conveyor 61 of the pressing line D. In automatically repeating order, as a sandwich is received on this entry conveyor, it produces actuation of the switch 62 with the result that the transfer conveyor E will be caused to return to the position adjoining the pressing line C to deliver a subsequent assembled sandwich thereto.

In arriving on the take-off conveyor 65 of either of the lines C or D, the pressed sandwich S is then delivered to the conveyor F. Now, in crossing the open area between these conveyors, the sandwich engages the lever 66 of a switch 67 and retains this engagement until substantially completely on conveyor F. Since the opposite end of this conveyor is relatively fixed, though pivotally mounted, in relation to the discharge conveyor B, the transfer conveyor F can immediately be swung from the full line position of Fig. 1 at the end of pressing line D to a similar position, indicated in broken line, relative to the end of pressing line C to receive a subsequent sandwich therefrom. Thus, as the first sandwich on transfer conveyor F is approaching the conveyor B, the transfer conveyor will have been swung by an operating drive, similar to the link 35, in adequate time to receive a second sandwich thereon from the alternate pressing line.

Figure 6:
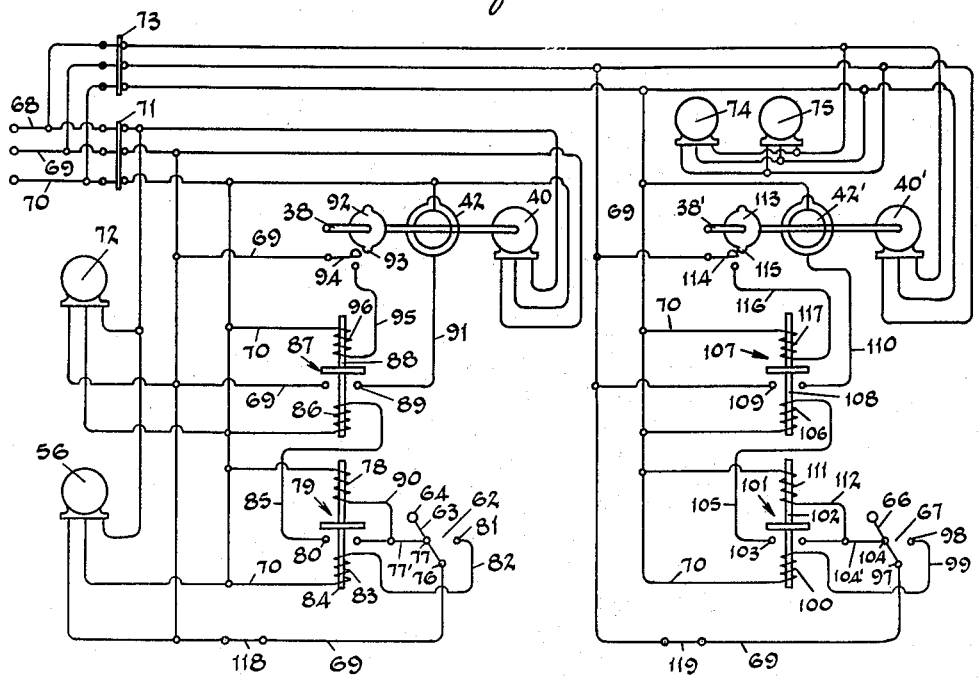
Fig. 6 is a diagrammatic view of an electrical circuit.

One electrical circuit for a control system, as herein provided and which is shown diagrammatically, by way of example, in Fig. 6, includes three source lines 68, 69 and 70 that are connected through manually operable switch 71 to the motor 40 for swinging the transfer conveyor E; the motor 72 for operating the conveyor belts 12 of the conveyor A, and the motor 56 for operating the belt 43 of the conveyor E. Additionally, through switch 73, the source lines 68, 69 and 70 are connected to the motor 74 for operating the belt of conveyor F and the motor 75 for operating the belt of end conveyor B. The source line 69, further, is connected to one side of switch 62. In one and the normal rest position, this switch by contacts 76 and 77 supplies current to the coil 78 of a relay switch 79 by line 77' as well as to one side of the contacts 80 thereof which, however, are presently open.

Now, when an assembled sandwich S is carried from the end of transfer conveyor E to the entry conveyor 61 of the line C, as shown in Fig. 1, the lever 63 is pivoted to such position that a circuit from source line 69 will be completed through contacts 76 and 81, line 82 to an opposed coil 83 of the relay switch 79 and to source line 70. Upon motion of the armature 84 the contacts 80 are engaged. Then upon release of the lever 63, contacts 76—81 are opened and contacts 76—77 are engaged so that by line 77' contacts 80 momentarily complete a circuit by line 85 to coil 86 of relay switch 87 and thence to source line 70; the armature 88 thereof then being moved to close contacts 89. However, the coil 78 substantially simultaneously is energized by branch line 90 from contacts 76—77 of switch 62 thereby moving the armature 84 to open the circuit of lines 69 and 85 at contacts 80.

The contacts 89 of relay switch 87, being closed, complete a circuit from source line 69 by line 91 to the conventional contacts of the electromagnetic clutch 42 and thence to source line 70 thereby operatively connecting the motor 40 to the reduction unit 41 to drive the shaft 38 and crank arm 37 by drive plate 37'. This causes the link 35 to swing the conveyor E, in the present instance, from the pressing line C to the pressing line D. Upon one-half revolution of the shaft 38, a cam 92 mounted thereon and by one lug 93 will actuate a switch 94 to complete a circuit from source line 69, by line 95 to the opposed coil 96 of switch 87, and thence to source line 70, to disengage contacts 89. This de-energizes the clutch 42 whereupon rotation of the shaft 38 is halted. The transfer conveyor E accordingly will now be located in the broken line position of Fig. 1.

As the next succeeding sandwich S is carried from the conveyor E to the conveyor 61 of the pressing line D, the switch 62 will again be operated to complete a circuit through the contacts 76 and 81 to re-close the contacts 80 of the switch 79. Again, upon release of lever 63, the circuit of lines 69—77' will be closed and this, as above described, will energize the clutch 42 and cause rotation of the shaft 38 and the cam 92. By a second lug 93, the cam again closes switch 94, upon the second half rotation of the shaft, to cause the de-energization of the clutch 42 at which time the transfer conveyor E will have been returned by action of the link 35 to a position adjacent the conveyor 61 of the pressing line C.

As the pressed sandwiches leave the actual pressing areas, as in Fig. 1, a sandwich, as from the line D, passes onto the transfer conveyor F.

When engagement of the sandwich with the lever 66 of switch 67 occurs, as described in connection with the switch 62, switch 67 completes a circuit from source line 69 through contacts 97 and 98 by line 99 to coil 100 of the relay switch 101 and thence to the source line 70. The armature 102 is then moved to close contacts 103. Now, upon release of the lever 66 from engagement with the sandwich, the switch 67 opens the circuit at contacts 97 and 98 and completes a circuit from source line 69 through contacts 97 and 104 by line 104' to contacts 103 and by line 105 to the coil 106 of relay switch 107 and thence to source line 70. Energization of coil 106, of course, activates the armature 108 to close contacts 109 and thereby completes a circuit through said contacts by line 110 to the electromagnetic clutch 42' and thence to source line 70. However, the circuit through contacts 103 is only momentary by reason of the fact that coil 111 of relay switch 101 is substantially simultaneously energized by line branch 112 whereby the armature 102 is moved to open contacts 103.

When the clutch 42' for the power source for transfer conveyor F is energized, it connects the motor 40' therefore to the shaft 38' and operate the associated crank parts and the link 35. Upon one-half rotation of the shaft 38', a cam 113 thereon closes a switch 114 by one lug 115 to momentarily complete a circuit from source line 69 and by line 116 to the opposed coil 117 of the switch 107 and thence to source line 70. This coil actuates the armature 108 to separate contacts 109 thereby opening the circuit to clutch 42'. This disconnects the motor 40' from the related shaft 38' and halts swinging movement of the conveyor F as it arrives at a position, as indicated in broken line in Fig. 1, to connect pressing line C to the end conveyor B.

The switches 71 and 73 may be utilized to completely "shut-down" operation of all the conveyors or the switch 71 can be opened individually to halt movement of assembled sandwiches on the conveyor A; from this conveyor to the transfer conveyor E; and from the transfer conveyor to the entry conveyor 61 of either of the pressing lines C and D. Should this occur, assembled sandwiches in either of the lines C and D will be pressed and passed on to the transfer conveyor F and thence to the discharge conveyor B if desired. However, if the switch 73 is also opened, the entire system of conveyors will be halted and movement of the sandwiches from the area of their assembly to the area from which the pressed sandwiches are removed to the autoclaves will be discontinued.

Likewise, in the event that it is desired to utilize only one of the pressing lines C or D, switches may be operated to temporarily remove the transfer conveyors E or F from their respective switches 62 and 67. For this purpose, a normally closed switch 118 is interposed in source line 69 to the switch 62. A similar normally closed switch 119 is included in source line 69 to switch 67. Now, for example, when the transfer conveyors E and F are located to deliver the assembled sandwiches S from the supply conveyor A to the processing conveyor line C and to deliver them thence to the discharge conveyor B, if the switches 118 and 119 are opened, the associated switches 62 and 67 will be rendered inoperative to cause swinging motion of either of the transfer conveyors to deliver or receive sandwiches, to or from the processing conveyor line D.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:
1. In a control system for conveyor mechanisms, a supply conveyor, means for moving an article on the supply conveyor along a predetermined path substantially transverse to a longer dimension of the article, a discharge conveyor for moving an article along a predetermined path and arranged in substantial alignment with the longitudinal axis of the entry conveyor, a pair of intermediate conveyors arranged substantially parallel to the aligned axes of the supply and discharge conveyors and equally spaced outwardly on opposite sides thereof, a transfer conveyor between an end of the supply conveyor and the adjacent end of each of the pair of intermediate conveyors, means pivotally mounting the transfer conveyor adjacent the end of the supply conveyor, a second transfer conveyor between the opposite end of each of the pair of intermediate conveyors and the discharge conveyor, means pivotally mounting the second transfer conveyor adjacent the discharge conveyor, a source of operative power, a linkage associated with the free end of the first transfer conveyor to alternatively swing the same between defined limits of a substantially arcuate path relative to the ends of the intermediate conveyors, means operably connecting the linkage to the source of power, a switch device carried by the first-named transfer conveyor at its exit end to engage the said connecting means when the article has been carried past said switch, means disengaging said connecting means when the first transfer conveyor has reached either limit of its arcuate movement, a second source of power, a linkage associated with the free end of the second-named conveyor to alternatively swing the same between defined limits of a substantially arcuate path relative to the opposite ends of the intermediate conveyors, means operably connecting the linkage to the second source of power, and means carried at the entry end of the second-named transfer conveyor for actuating the connecting means between the second-named linkage and the second-named source of power.

2. A mechanism as defined in claim 1, wherein means is provided on the first-named transfer conveyor for turning an article moving thereon from a path substantially transverse to its longer dimension to a predetermined path substantially parallel with the said longer dimension.

References Cited in the file of this patent
UNITED STATES PATENTS

| | | |
|---|---|---|
| 1,290,862 | Adderson | Jan. 14, 1919 |
| 1,828,213 | Bacheller | Oct. 20, 1931 |
| 2,334,384 | Cohen | Nov. 16, 1943 |
| 2,627,334 | Koppel | Feb. 3, 1953 |
| 2,761,542 | Pagdin | Sept. 4, 1956 |